US007549818B2

(12) United States Patent
Rafeld

(10) Patent No.: US 7,549,818 B2
(45) Date of Patent: Jun. 23, 2009

(54) HOLLOW PROFILE CONFORMING U-SHAPED CONNECTOR

(75) Inventor: Karl Rafeld, Wildpoldsried (DE)

(73) Assignee: CERA Handelsgesellschaft mbH, Kaufbeuren (DE)

( * ) Notice: Subject to any disclaimer, the term of this patent is extended or adjusted under 35 U.S.C. 154(b) by 0 days.

(21) Appl. No.: 10/839,598

(22) Filed: May 5, 2004

(65) Prior Publication Data

US 2005/0013659 A1 Jan. 20, 2005

(30) Foreign Application Priority Data

May 8, 2003 (DE) ............................ 203 07 201 U

(51) Int. Cl.
*F16B 7/00* (2006.01)

(52) U.S. Cl. ....................................... 403/292; 403/298

(58) Field of Classification Search ................. 403/286, 403/292–295, 298
See application file for complete search history.

(56) References Cited

U.S. PATENT DOCUMENTS 3,883,257 A * 5/1975 Delafield .................... 403/298

FOREIGN PATENT DOCUMENTS

EP 750090 A2 * 12/1996

* cited by examiner

*Primary Examiner*—Victor MacArthur
(74) *Attorney, Agent, or Firm*—Gifford, Krass, Sprinkle, Anderson & Citkowski, P.C.

(57) ABSTRACT

A U-shaped linear connector having a configuration that conforms to a hollow profile of a spacing profile for insulated glass may include lateral legs with outwardly extending springs. The hollow profile may include a roof surface extending parallel to a bottom surface and lateral walls. The lateral walls may include inverted flanks between the roof surface and lateral walls. The springs may be inclined outwardly and end at the flank and abut the lateral walls and a roof surface of the hollow profile. Therefore, the springs may operate to receive and assist in dispersing a deforming pressure transmitted from the roof surface of the hollow profile to the lateral legs of the linear connector so that a deformation of the lateral walls is avoided as is the collapse inwardly of the laterals walls under pressure.

1 Claim, 2 Drawing Sheets

FIG - 1
Prior Art
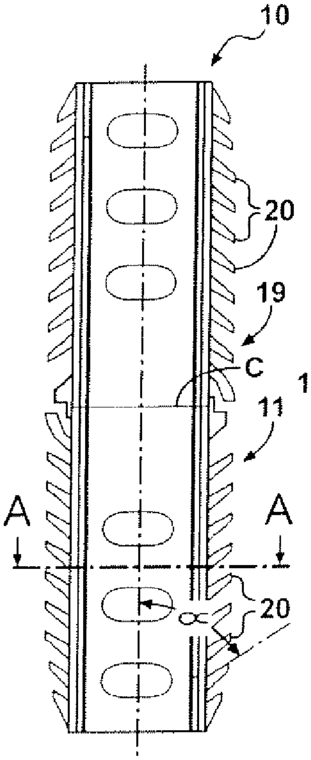
FIG - 2
Prior Art
FIG - 3
Prior Art
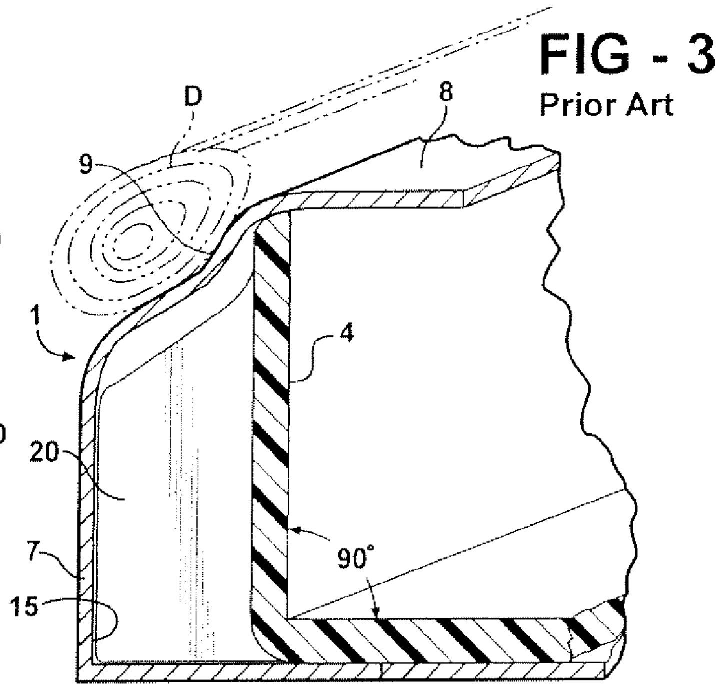
FIG - 4
Prior Art
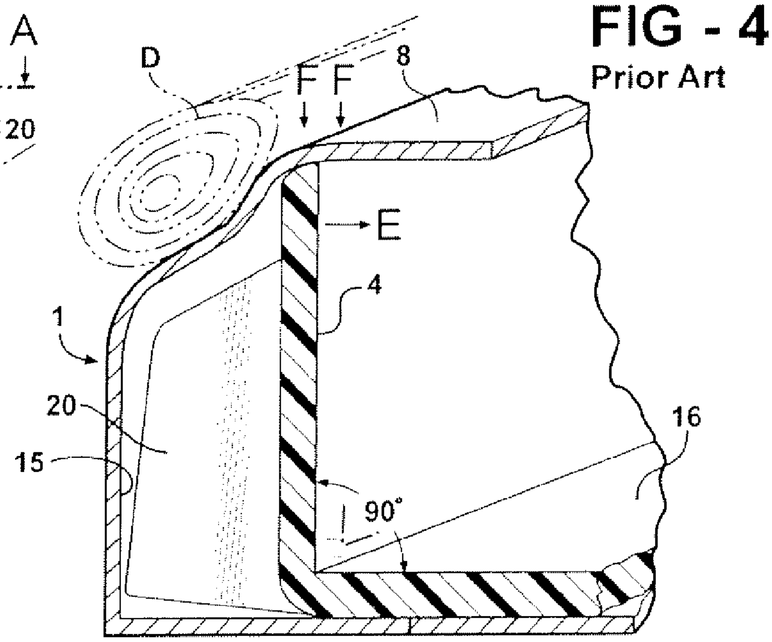

FIG - 5
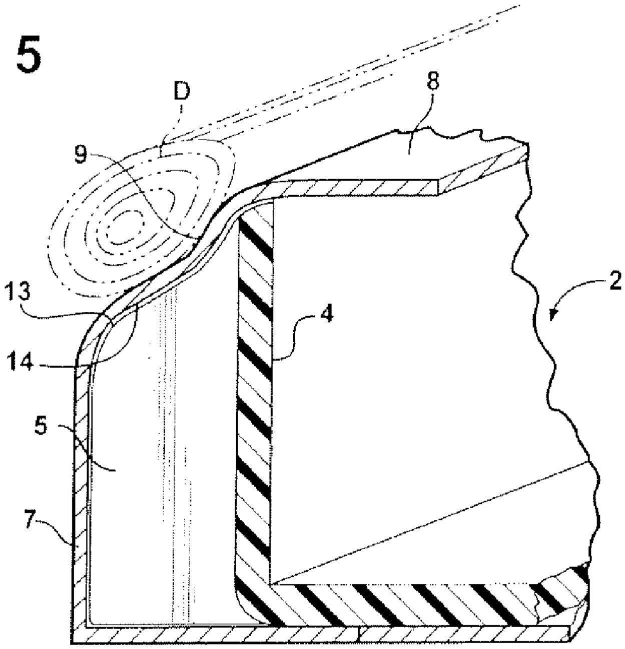
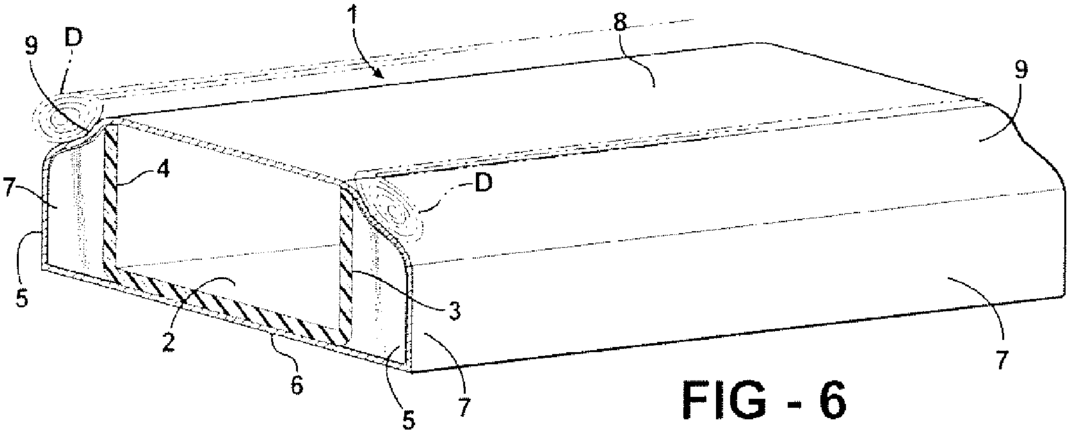
FIG - 6
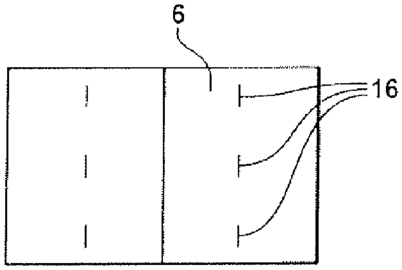
FIG - 7

HOLLOW PROFILE CONFORMING U-SHAPED CONNECTOR

BACKGROUND OF THE INVENTION

1. Field of the Invention

The invention concerns an U-shaped linear connector of plastic material for joining box-like hollow spacing profiles of multiple insulating glasses, comprised especially of steel and provided with perforated bottoms. The linear connector is provided at its lateral legs with outwardly directed, inclined, plate-like springs extending in the direction of the longitudinal axis of the connector successively behind one another, and the hollow profiles are provided with a rectangular cross-section and a perforated bottom surface, parallel lateral walls and a roof surface extending parallel ot the bottom surface and having depressed, concavo-convex or rounded, respectively, butyl-receiving flanks between the roof surface and the lateral walls.

2. Description of Related Art

Such kind of linear connector is known and for instance specified in the European Patent 0750090. The plate-like springs used at the known linear connectors, which are called laminas, are used to increase the friction between the linear connector and the inner wall of the hollow profile by contacting in a force transmitting manner the inner walls of the profile on the insertion of the linear connector into the hollow profile and should thus avoid that the connection by friction of the linear connector is released especially on changing temperature conditions after its insertion with the consequence that the area of connection is opened.

It has been found that the connection by transmission of friction forces is apparently not sufficient to fix the linear connector in its seat. In this connection it has been observed that the reason for releasing the pressure seat of the linear connector within the hollow space of the profile is caused by the fact that the lateral plate-like springs of the linear connector turn aside inwardly and the changes of the pressure transmitted from the hollow profile to the linear connector caused for instance by changing temperature resulting therein that the lateral plate-like springs are slanting in some extent to the perforated bottom surface. Although that movement inwardly of the lateral plate-like spring is not significant, it is sufficient in order to destroy the secure support of the connector within the hollow space of the profile.

BRIEF SUMMARY OF THE INVENTION

The object underlying the invention should therefore be seen therein to change the U-shaped linear connector such that its fix seat within the hollow space of the profile is even under changing pressure conditions or, respectively, load conditions, caused for instance by thermal tensions maintained. This problem is solved according to the subject invention by the fact that the plate-like springs which are slanting outwardly are precisely ending at the butyl mass receiving edge of the flank and the rounding radius at the abutment of the lateral wall and the roof surface of the hollow profile and thus support the deforming pressure transmitted from the roof surface of the hollow profile to the lateral plate-like springs of the linear connector, avoiding thus the cold deformation of the lateral plate-like springs and in consequence thereof their collapse inwardly under permanent pressure.

An advantageous embodiment of this measure is claimed by the subclaim pointing out that in any way the such configured plate-like springs can no longer freely move so that the lateral plate-like springs retain their original mounting position and thus guarantee the fix seat of the linear connector.

BRIEF DESCRIPTION OF THE DRAWINGS

The invention is described in more detail in the following on the basis of the embodiments shown in the drawings. In the drawings are:

FIG. 1 a plan view of a linear connector of known configuration,

FIG. 2 a cross-sectional view of the linear connector of FIG. 1,

FIG. 3 a enlarged schematical cross-sectional view of the linear connector of FIG. 1 in mounted condition within the hollow space profile, FIG. 4 a schematical cross-sectional view of a connector corresponding to that as shown in FIG. 1 and provided with lateral plate-like springs deformed inwardly, FIG. 5 a cross-sectional view corresponding to that one as shown in FIGS. 3 and 4, provided, however, with a linear connector according to the invention in mounted condition, FIG. 6 a perspective, schematical view of the linear connector according to the invention in mounted condition on the basis of FIG. 5, and FIG. 7 a bottom view of the hollow distant profile of FIG. 6.

DETAILED DESCRIPTION

In FIGS. 1-4 of the drawings a U-configured linear connector 10 known per se, provided of plastic material is schematically shown as well as the mounted condition of that connector within a case-like hollow distant profile the bottom thereof is perforated.

The known linear connector 10 as shown in FIGS. 1-3 is especially provided for joining hollow spacing profiles 1 of multiple insulating glasses and is provided for that purpose with a flat, longitudinal body. The one piece 19 of the longitudinal body can be inserted into the hollow space of the one spacing profile and the other logitudinal piece 11 can be inserted into the hollow space of the other spacing profile which is to be connected to the first one. The linear connector 10 has a U-configured cross-section for the passing of a hygroscopic powder and is provided at both sides of the center C of its body at its two parallel legs 3, 4 with lateral plate-like springs 20 inclined by an angle $\alpha$ with respect to the axis B in order to increase the frictional force between the surface of the linear connector and the surface of the inner wall of the spacing profile, which lateral plate-like springs are as shown in FIG. 3 in mounted condition distantly arranged behind one another in the direction of the longitudinal axis B of the connector. These lateral plate-like springs contact in mounted condition the inner surface 15 of the lateral wall 7 of the hollow spacing profile 1. Because of that condition a force transmitting seat between the connector and the hollow profile is caused.

In case of a permanent pressure onto the legs 3, 4 of the linear connector which is performed by the roof surface 8 of the hollow profile 1 in the direction of the arrows F in FIG. 4, for instance caused by changing of temperatures, the legs 3, 4 forming with the perforated bottom surface of the linear connector an entire unit and including normally with that bottom surface an angle of 90°, intended to tilt inwardly in the direction of the arrow E, causing the plate-like springs 20 to release their frictional connection with the inner surface 15 of the parallel lateral wall 7 of the hollow profile 1 as shown schematically in FIG. 4 resulting therein that the linear connector relaxes so that the binding between the two hollow profile bodies is released.

This disadvantage is avoided according to the subject invention as shown in FIGS. 5-7 by the configuration of the linear connector 2. By the fact that the outwardly rising lateral plate-like springs 5 and by their upper edge 13 end precisely at the inner wall 14 of the edge receiving the butyl mass D provided by flank and round-off radius 9 at the abutment of the lateral wall 7 and the roof surface 8 of the hollow profile 1 as shown in FIGS. 5 and 6, it is attained that the plate-like springs 5 support the deforming pressure transmitted by the roof surface 8 of the hollow profile 1 on to the legs 3, 4 of the linear connector 2 and avoid thus a cold deformation of the legs resulting therein that they would otherwise collapse under permanent pressure. The upper edge 13 of the plate-like spring 5 is advantageously provided with an outline corresponding that one of the inner wall 14 in the area of the rounding-off radius 9 so that the pressure excerted from the roof surface 8 of the hollow profile on the legs 3, 4 and the plate-like springs 5 can be dispersed even more uniformly. Thus, deformation and inclination of the legs 3, 4 are avoided. Moreover, the plate-like springs 5 can be on this way fixed within the hollow profile so that they can no longer move, and a possible permanent pressure onto the roof surface 8 will be transmitted to the bottom surface 6 of the hollow profile provided with perforations 16.

The invention claimed is:

1. A connector and profile assembly comprising:

a hollow insulated glass spacing profile having a bottom surface, a roof surface that extends parallel to the bottom surface, and a pair of lateral walls extending perpendicularly upwards from opposite ends of the bottom surface, each lateral wall having a convex depressed portion extending from an upper end thereof to a respective outer end of the roof surface;

a U-shaped linear connector longitudinally inserted in the profile, the connector having a bottom plate and a pair of lateral legs extending perpendicularly upwards from opposite ends of the bottom plate;

each lateral leg having an outer side with a plurality of springs extending homogenously outward therefrom, the springs being inclined at a common angle in a common direction toward a longitudinal centerline of the connector, each spring having an upper concave surface conforming to the convex depressed portion;

two voids, each void defined by one of the depressed portions, one of the lateral walls, one of the lateral legs, and one of two opposite outer portions of the bottom surface; and wherein each spring has an outer perimeter in complete conforming contact with an inner perimeter of one of the voids such that each spring is operable to receive a deforming pressure transmitted to the spring through the roof surface of the spacing profile to prevent collapse of the lateral legs.

* * * * *